(12) United States Patent
Leland (10) Patent No.: US 8,449,263 B2
(45) Date of Patent: May 28, 2013

(54) SEGMENTED ROTOR HUB ASSEMBLY (75) Inventor: Kenneth Bradley Leland, Greer, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/313,653

(22) Filed: Dec. 7, 2011

(65) Prior Publication Data

US 2012/0134840 A1    May 31, 2012

(51) Int. Cl.
*B64C 11/02* (2006.01)

(52) U.S. Cl.
USPC ............... 416/244 A; 416/244 R; 29/889.21; 29/889.22

(58) Field of Classification Search
USPC .......... 416/244 R, 248, 245 R, 245 A, 244 A, 416/244 B, 208
See application file for complete search history.

(56) References Cited

U.S. PATENT DOCUMENTS

| 6,942,461 | B2 * | 9/2005 | Wobben | 416/210 R |
|---|---|---|---|---|
| 7,244,102 | B2 | 7/2007 | Delucis | |
| 2006/0104820 | A1 * | 5/2006 | Delucis | 416/244 R |
| 2009/0129931 | A1 | 5/2009 | Stiesdal | |
| 2009/0317256 | A1 * | 12/2009 | Quell | 416/204 R |
| 2010/0290918 | A1 * | 11/2010 | Pedersen | 416/245 R |
| 2011/0142658 | A1 * | 6/2011 | Bonnet | 416/204 R |

* cited by examiner

*Primary Examiner* — Edward Look
*Assistant Examiner* — William Grigos
(74) *Attorney, Agent, or Firm* — Dority & Manning, P.A.

(57) ABSTRACT

In one aspect, a rotor hub assembly for a wind turbine is disclosed. The rotor hub assembly may generally comprise an inner hub including a plurality of hub segments assembled together and a hub enclosure including a plurality of enclosure segments assembled together. The hub enclosure may be configured to at least partially enclose the inner hub. In addition, the rotor hub assembly may include a plurality of support members extending between the inner hub and the hub enclosure.

8 Claims, 7 Drawing Sheets

SEGMENTED ROTOR HUB ASSEMBLY

FIELD OF THE INVENTION

The present subject matter relates generally to wind turbines and, more particularly, to a segmented rotor hub assembly for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. However, as the size of wind turbines increases, so do the respective costs of manufacturing, transporting, and assembly of the wind turbines. Thus, the economic benefits of increased wind turbine sizes must be weighed against these factors. For example, the costs of manufacturing, transporting, and/or assembling a rotor hub for a larger wind turbine may significantly impact the economic advantage of providing such a wind turbine.

Accordingly, there is a need for a wind turbine rotor hub design that may reduce the associated transportation and/or assembly costs of a wind turbine.

BRIEF DESCRIPTION OF THE INVENTION

Aspects and advantages of the invention will be set forth in part in the following description, or may be obvious from the description, or may be learned through practice of the invention.

In one aspect, the present subject matter discloses a rotor hub assembly for a wind turbine. The rotor hub assembly may generally comprise an inner hub including a plurality of hub segments assembled together and a hub enclosure including a plurality of enclosure segments assembled together. The hub enclosure may be configured to at least partially enclose the inner hub. In addition, the rotor hub assembly may include a plurality of support members extending between the inner hub and the hub enclosure.

In another aspect, the present subject matter discloses an inner hub for a wind turbine. The inner hub may generally comprise a hollow body formed by a plurality of hub segments assembled together. The hollow body may include a plurality of blade flanges. Each of the blade flanges may be configured to be coupled to one of a plurality of rotor blades of the wind turbine.

In a further aspect, the present subject matter discloses a method for assembling a rotor hub assembly of a wind turbine. The method may generally include assembling a plurality of individual hub modules, wherein each of the plurality of individual hub modules including a hub segment, an enclosure segment and at least one support member extending between the hub segment and the enclosure segment and assembling the plurality of individual hub modules together to form the rotor hub assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates an exploded view of the rotor hub assembly shown in FIGS. 4 and 5; and, FIG. 7 illustrates a cross-sectional view of one embodiment of inwardly extending flanges that may be utilized to couple the hub segments of the inner hub and the enclosure segments of the hub enclosure together at their respective joints.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a segmented rotor hub assembly for a wind turbine. Specifically, in several embodiments, the rotor hub assembly may include an inner hub formed from a plurality of hub segments and a hub enclosure formed from a plurality of enclosure segments. By segmenting both the inner hub and the hub enclosure of the rotor hub assembly, the costs associated with transporting the rotor hub assembly to a wind turbine site and/or assembling the rotor hub assembly may be significantly reduced. For example, in one embodiment, the hub segments and the enclosure segments may be assembled in modules forming substantially equal percentages or portions of the entire rotor hub assembly. These modules may then be shipped to the wind turbine site and/or assembled together at the wind turbine site (e.g., at a location near the wind turbine tower or aloft using a crane or other suitable lifting mechanism).

Figure 1:
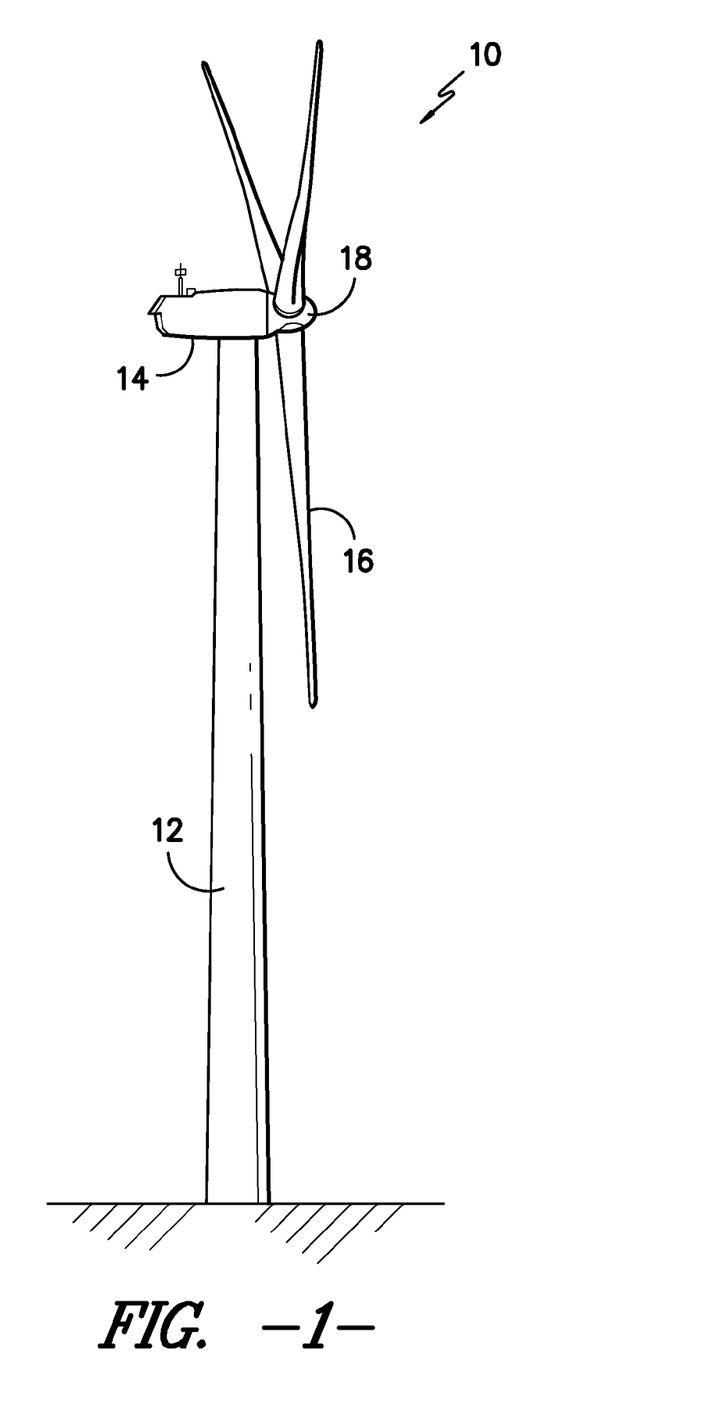
FIG. 1 illustrates a perspective view of one embodiment of a wind turbine.

Referring now to the drawings, FIG. 1 illustrates a perspective view of one embodiment of a wind turbine 10. The wind turbine 10 includes a tower 12 with a nacelle 14 mounted thereon. A plurality of rotor blades 16 are mounted to a rotor hub assembly 18, which is, in turn, coupled to a main rotor shaft (not shown) of the wind turbine). The wind turbine power generation and control components (not shown) may be housed within the nacelle 14. It should be appreciated that the wind turbine 10 of FIG. 1 is provided for illustrative purposes only to place the present subject matter in an exemplary field of use. Thus, one of ordinary skill in the art should understand that the present subject matter is not limited to any particular type of wind turbine configuration.

Figure 2:
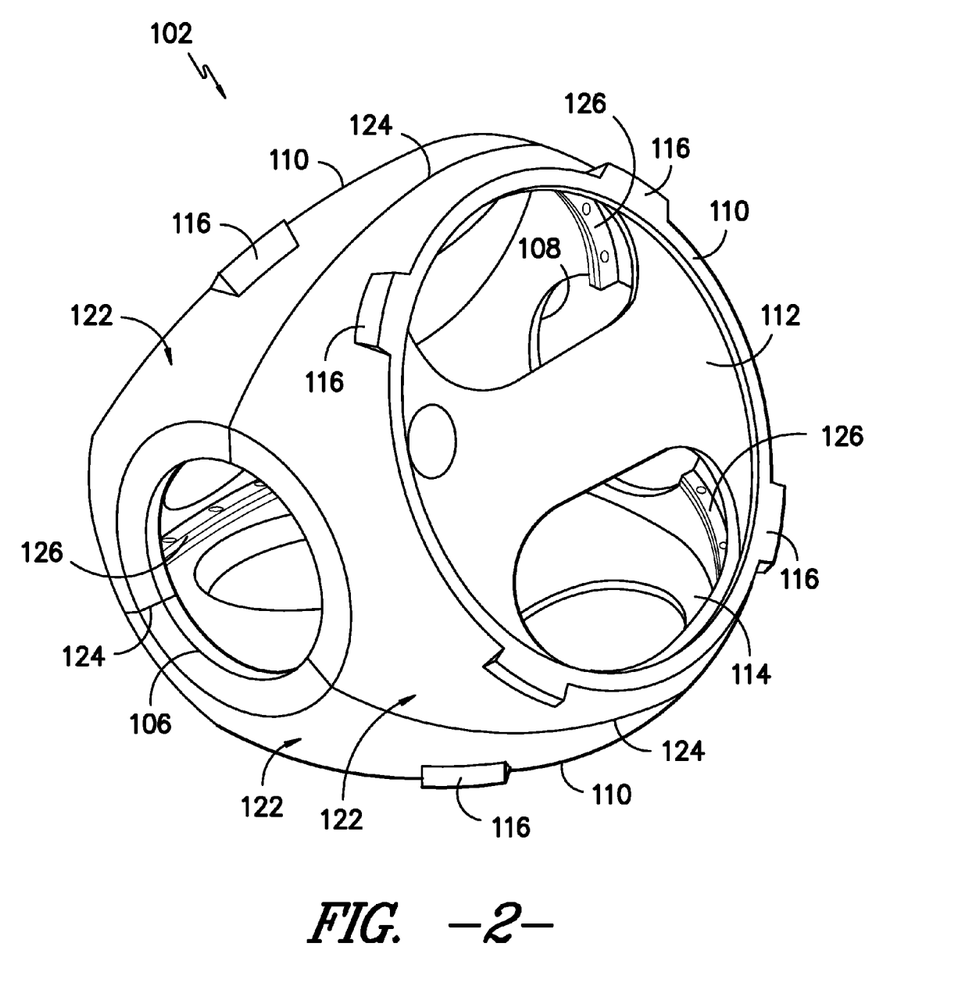
FIG. 2 illustrates a perspective view of one embodiment of an inner hub of a rotor hub assembly for a wind turbine.
Figure 3:
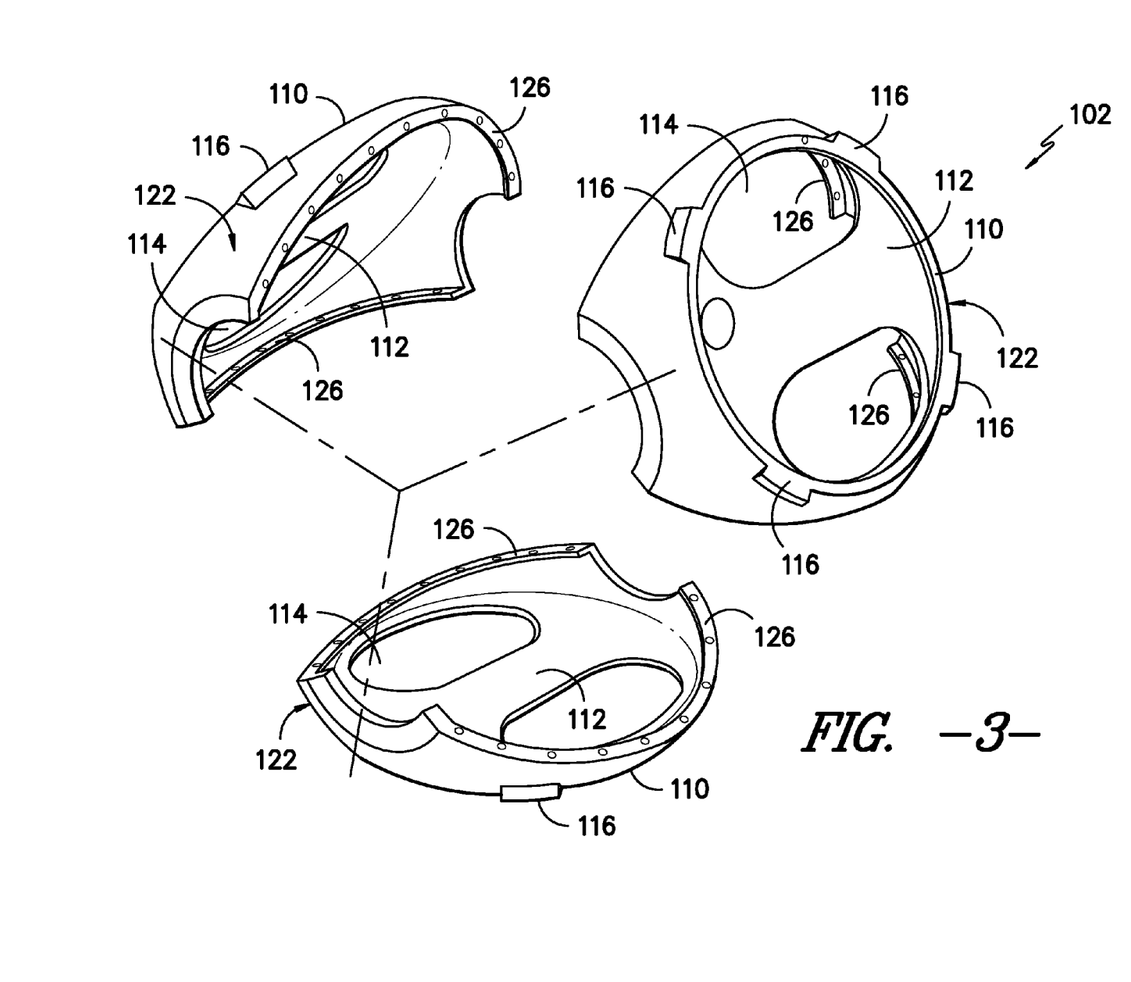
FIG. 3 illustrates an exploded view of the inner hub shown in FIG. 2.

Referring now to FIGS. 2 and 3, one embodiment of an inner hub 102 of a rotor hub assembly 100 (FIGS. 4-6) for a wind turbine 10 is illustrated in accordance with aspects of the present subject matter. In particular, FIG. 2 illustrates a perspective view of the inner hub 102. Additionally, FIG. 3 illustrates an exploded view of the inner hub 102 shown in FIG. 2.

As shown, the inner hub 102 generally comprises a hollow body configured for coupling the rotor blades 16 (FIG. 1) of the wind turbine 10 to a rotor shaft (not shown) of the turbine 10. In general, the inner hub 102 may extend between a first end 106 and a second end 108, with the first end 106 or the second end 108 being configured to receive and/or be coupled to the rotor shaft. In addition, the inner hub 102 may include a plurality of blade flanges 110 spaced apart around the outer perimeter of the inner hub 102. The number of blade flanges 110 may generally correspond to the number of the turbine rotor blades 16. For instance, as shown in the illustrated embodiment, the inner hub 102 includes three blade flanges 110, with each blade flange 110 being spaced apart from one another by approximately 120 degrees. Each blade flange 110 may generally be configured to be coupled to one of the rotor blades 16 via a pitch bearing (not shown). For example, in several embodiments, each blade flange 110 may define a generally planar, circular area to which a suitable pitch bearing may be secured (e.g., using bolts and/or any other suitable fastening mechanisms). The inner hub 102 may also include one or more stiffening webs 112 extending across an opening 114 defined by each blade flange 110. As is generally understood, the stiffening web(s) 112 may be configured to increase the structural stiffness and rigidity of the inner hub 102 at and/or adjacent to each blade flange 110.

Figure 4:
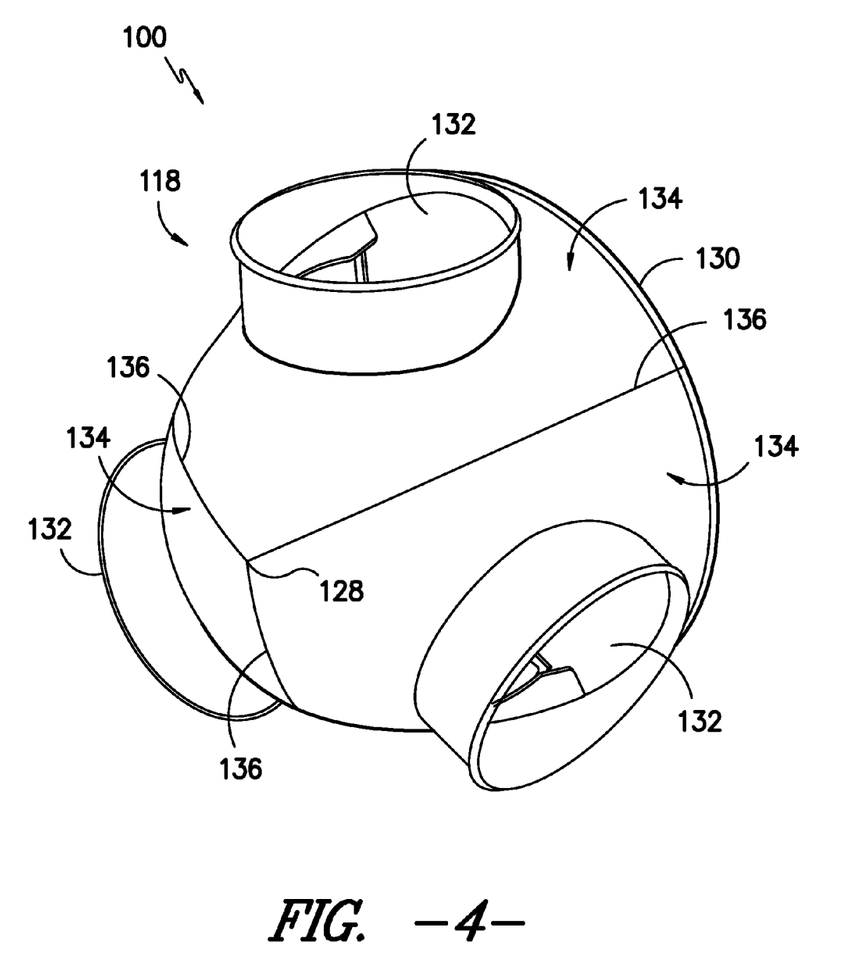
FIG. 4 illustrates a perspective view of one embodiment of a rotor hub assembly for a wind turbine, particularly illustrating a front, perspective view of one embodiment of a hub enclosure of the rotor hub assembly.
Figure 5:
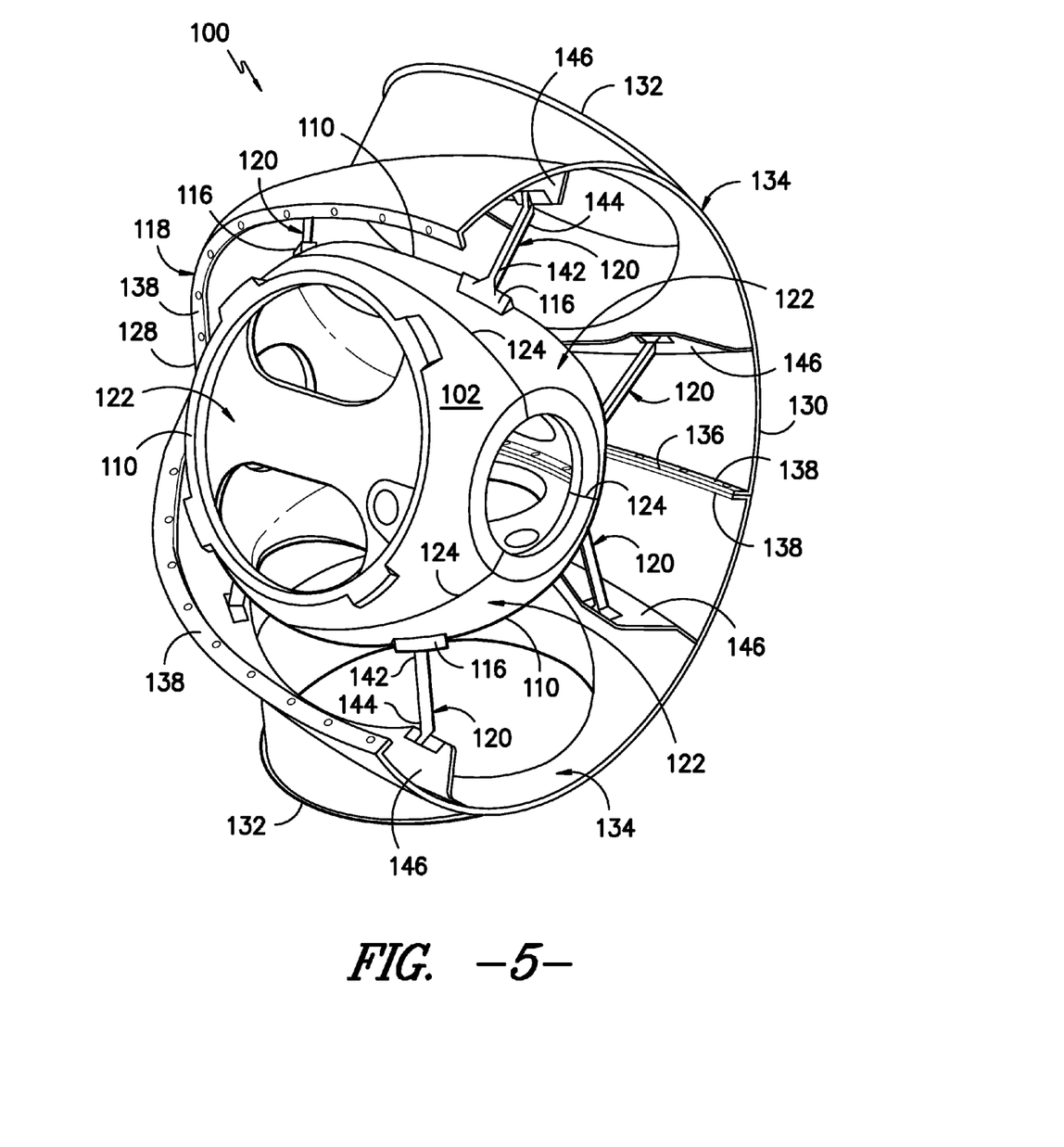
FIG. 5 illustrates a rear, perspective view of the rotor hub assembly shown in FIG. 4, particularly illustrating a portion of the hub enclosure being removed to show the inner hub of the rotor hub assembly.
Figure 6:
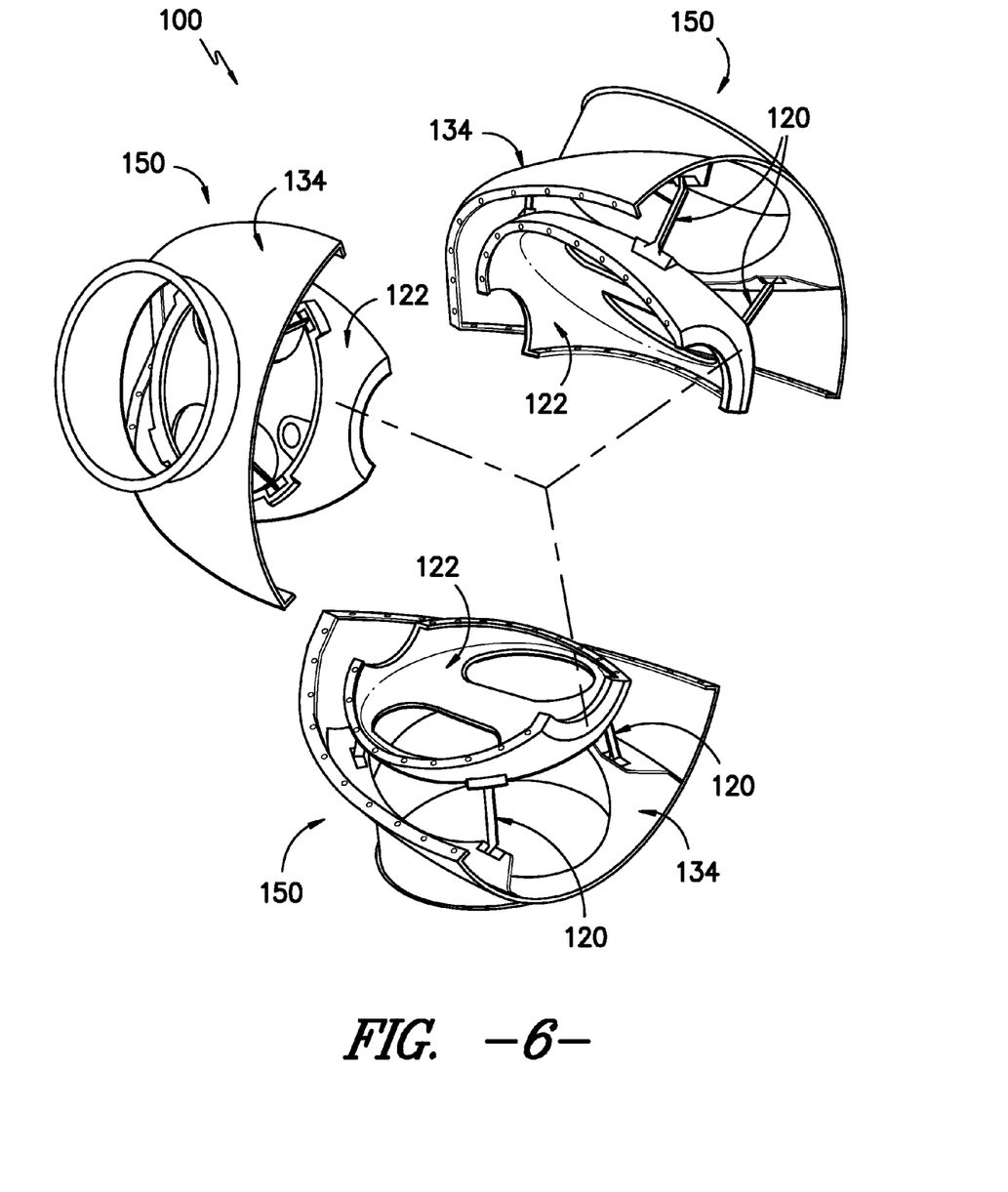

Additionally, in several embodiments, the inner hub 102 may include a plurality of connection areas 116 spaced apart around its outer perimeter for coupling the inner hub 102 to a hub enclosure 118 of the hub assembly 100 (FIGS. 4-6). For example, as shown in FIG. 2, a plurality of connection areas 116 may be defined at and/or adjacent to each blade flange 110 (e.g., by being defined around the outer circumference of each blade flange 110), with each connection area 116 comprising a projected or flattened portion of the outer surface of the inner hub 102. As will be described in greater detail below with reference to FIGS. 5 and 6, in several embodiments, a support member 120 may be configured to be secured to the inner hub 102 at each connection area 116 so as to permit the hub enclosure 118 of the hub assembly 100 to be coupled to the inner hub 102. Such an arrangement may provide an annular space between the inner hub 102 and the hub enclosure 118 to allow maintenance workers to access the inner hub 102 from the nacelle 14.

Referring still to FIGS. 2 and 3, in accordance with several embodiments of the present subject matter, the inner hub 102 may be formed from a plurality of hub segments 122, with the hub segments 122 being configured to be assembled together to form the entire hollow body of the inner hub 102. In general, it should be appreciated that the inner hub 102 may be formed from any number of hub segments 122. For example, as shown in the illustrated embodiment, the inner hub 102 is formed from three hub segments 122. However, in alternative embodiments, the inner hub 102 may be formed from two hub segments 122 or from more than three hub segments 122, such as four hub segments 122, five hub segments 122 and/or the like.

In several embodiments, each hub segment 122 may be configured to form a substantially equal percentage or portion of the inner hub 102. For example, as shown in FIGS. 2 and 3, each of the hub segments 122 may be configured to form substantially one-third of the inner hub 102, such as by configuring each hub segment 122 to form an approximately 120 degree section of the inner hub 102. Specifically, as shown in FIG. 3, the hub segments 122 may divide the inner hub 102 into three substantially equal circumferential sections, with each circumferential section including one of the blade flanges 110 of the inner hub 102. Thus, when the hub segments 122 are assembled together, a hub joint 124 may be defined between each pair of adjacent hub segments 122 that extends directly between the blade flanges 110 of such hub segments 122. Such a configuration may provide for a segmented inner hub 102 without creating a high stress concentration at the blade flanges 110.

In embodiments in which the inner hub 102 includes a different number of hub segments 122, it should be appreciated that the hub segments 122 may be configured to form any other substantially equal percentage or portion of the inner hub 102. For instance, in an embodiment in which the inner hub 102 includes four hub segments 122, each of the hub segments 122 may be configured to form substantially one-fourth of the inner hub 102, such as by configuring each hub segment 122 to form an approximately 90 degree section of the inner hub 102.

It should be appreciated that, by the terms "substantially equal percentage" or "substantially equal portion," it is meant that each hub segment 122 forms a percentage of the hollow body of the inner hub 102 equal to 100 divided by the total number of hub segments 122, with such percentage falling within a tolerance range of +/−10%. Thus, when the inner hub 102 includes three hub segments 122, the hub segments 112 may each form a substantially equal percentage or portion of the inner hub 102 by forming 33.3%+/−10% (23.3% to 43.3%) of the overall body of inner hub 102.

In alternative embodiments, it should be appreciated that the hub segments 122 need not be configured to form substantially equal percentages or portions of the inner hub 102. For instance, in one embodiment, the inner hub 102 may include a first hub segment 122 configured to form two-thirds of the inner hub 102 and a second hub segment 122 configured to form one-third of the inner hub 102.

Figure 7:
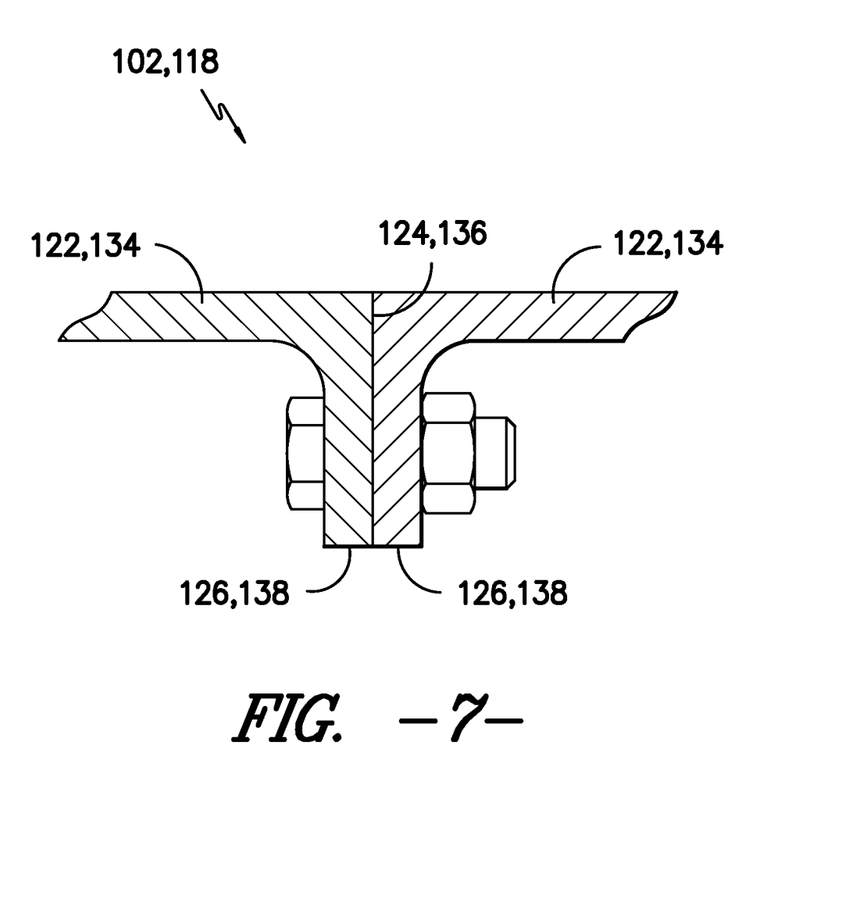

Additionally, it should be appreciated that the hub segments 122 may be configured to be coupled to another at the hub joints 124 using any suitable means known in the art. For example, as shown in the cross-sectional view of FIG. 7, in one embodiment, each hub segment 122 may include an inwardly extending flange 126 at and/or adjacent to each hub joint 124. Thus, when the hub segments 122 are assembled together, the inwardly extending flanges 126 of each hub segment 122 may be secured to the inwardly extending flanges 126 of adjacent hub segments 122 (e.g., by using bolts, screws, pins, rivets and/or any other suitable fastening mechanisms). In alternative embodiments, the adjacent hub segments 122 may be coupled to one another using any other suitable attachment means and/or method, such as by welding the adjacent hub segments 122 together at the blade joints 124.

It should also be appreciated that the hub segments 122 may be formed using any suitable manufacturing process and/or material. For example, in several embodiments, each hub segment 122 may be manufactured using a casting process and may be formed from a suitable metal or other suitable casting material. In other embodiments, each hub segment 122 may be manufactured using a molding process and may be formed from any suitable moldable material.

Referring now to FIGS. 4-6, one embodiment of a rotor hub assembly 100 within which the inner hub 102 described above may be utilized is illustrated in accordance with aspects of the present subject matter. In particular, FIG. 4 illustrates a perspective view of the rotor hub assembly 100, particularly illustrating a front, perspective view of a hub enclosure 118 of the hub assembly 100. FIG. 5 illustrates a rear, perspective view of the rotor hub assembly 100 shown in FIG. 4 with a portion of the hub enclosure 118 removed to show the inner hub 102 disposed therein. Additionally, FIG. 6 illustrates an exploded view of the rotor hub assembly shown in FIGS. 4 and 5.

As shown, the rotor hub assembly 100 may generally include the inner hub 102 described above with reference to FIGS. 2 and 3. In addition, the rotor hub assembly 102 may include a hub enclosure 118 configured to at least partially surround or otherwise enclose the inner hub 102. In general, the hub enclosure 118 may comprise a hollow body extending between a forward end 128 generally defining the nose or front face of the rotor hub assembly 100 and an aft end 130 configured to be disposed at and/or adjacent to a portion of the nacelle 14 (FIG. 1) when the rotor hub assembly 100 is mounted onto the wind turbine 10. Additionally, the hub enclosure 118 may generally define a rounded cone shape, with the diameter or cross-sectional height of the hub enclosure 118 generally increasing from forward end 128 to the aft end 130. As such, the hub enclosure 118 may define an open volume between its forward and aft ends 128, 130 within which the inner hub 102 may be disposed.

As shown in FIGS. 4-6, the hub enclosure 118 may also define a plurality of blade openings 132 for receiving the rotor blades 16 of the wind turbine 10. For example, as shown in the illustrated embodiment, the hub enclosure 118 may define three blade openings 132 spaced apart from one another by approximately 120 degrees. As is generally understood, the rotor blades 16 of the wind turbine 10 may be configured to be coupled to the inner hub 102 at the blade flanges 110 and may extend outwardly therefrom through the blade openings 132. Thus, in several embodiments, the inner hub 102 may be configured to be disposed and/or oriented within the hub enclosure 118 such that the blade flanges 110 of the inner hub 102 are circumferentially aligned with the blade openings 132 of the hub enclosure 118.

Referring still to FIGS. 4-6, in accordance with several embodiments of the present subject matter, the hub enclosure 118 may be formed from a plurality of enclosure segments 134, with the enclosure segments 134 being configured to be assembled together to form the entire hollow body of the hub enclosure 118. In general, it should be appreciated that the hub enclosure 118 may be formed from any number of enclosure segments 134. For example, as shown in the illustrated embodiment, the hub enclosure 118 is formed from three enclosure segments 134. However, in alternative embodiments, the hub enclosure 118 may be formed from two enclosure segments 134 or from more than three enclosure segments 134, such as four enclosure segments 134, five enclosure segments 134 and/or the like.

In several embodiments, each enclosure segment 134 may be configured to form a substantially equal percentage or portion of the hub enclosure 118. For example, as shown in the illustrated embodiment, each of the enclosure segments 134 may be configured to form substantially one-third of the hub enclosure 118, such as by configuring each enclosure segment 134 to form an approximately 120 degree section of the hub enclosure 118. Specifically, as shown in FIG. 4, the enclosure segments 134 may divide the hub enclosure 118 into three substantially equal circumferential sections, which each circumferential section defining one of the blade openings 132 of the hub enclosure 118. Thus, when the enclosure segments 134 are assembled together, an enclosure joint 136 may be defined between each pair of adjacent enclosure segments 134 that extends directly between the blade openings 132 of such enclosure segments 134.

In embodiments in which the hub enclosure 118 includes a different number of enclosure segments 134, it should be appreciated that the enclosure segments 134 may be configured to form any other substantially equal percentage or portion of the hub enclosure 118. For instance, in an embodiment in which the hub enclosure 118 includes four enclosure segments 134, each of the enclosure segments 134 may be configured to form substantially one-fourth of the hub enclosure 118, such as by configuring each enclosure segment 118 to form an approximately 90 degree section of the hub enclosure 118.

It should be appreciated that, by the terms "substantially equal percentage" or "substantially equal portion," it is meant that each enclosure segment 134 forms a percentage of the hollow body of the hub enclosure 118 equal to 100 divided by the total number of enclosure segments 134, with such percentage falling within a tolerance range of +/−10%. Thus, when the hub enclosure 118 includes three enclosure segments 134, the enclosure segments 134 may each form a substantially equal percentage or portion of the hub enclosure 118 by each forming 33.3%+/−10% (23.3% to 43.3%) of the overall body of hub enclosure 118.

In alternative embodiments, it should be appreciated that the enclosure segments 134 need not be configured to form substantially equal percentages or portions of the hub enclosure 118. For instance, in one embodiment, the hub enclosure 118 may include a first enclosure segment 134 forming two-thirds of the hub enclosure 118 and a second enclosure segment 134 forming one-third of the hub enclosure 118.

Additionally, it should be appreciated that the enclosure segments 134 may be configured to be coupled to another at the enclosure joints 136 using any suitable means known in the art. For example, as shown in the cross-sectional view of FIG. 7, in one embodiment, each enclosure segment 134 may include an inwardly extending flange 138 at and/or adjacent to each enclosure joint 136. Thus, when the enclosure segments 134 are assembled together, the inwardly extending flanges 138 of each enclosure segment 134 may be secured to the inwardly extending flanges 138 of adjacent enclosure segments 134 (e.g., by using bolts, screws, pins, rivets and/or any other suitable fastening mechanisms). In alternative embodiments, the adjacent enclosure segments 134 may be coupled to one another using any other suitable attachment means and/or method, such as by welding the adjacent enclosure segments 134 together at the enclosure joints 136.

It should also be appreciated that the enclosure segments 134 may be formed using any suitable manufacturing process and/or material. For example, in several embodiments, each enclosure segment 134 may be manufactured using a casting process and may be formed from a suitable metal and/or other suitable casting material. In other embodiments, each enclosure segment 134 may be manufactured using a molding process and/or an infusion process and may be formed from any suitable moldable and/or infusible material (e.g., a fiber reinforced composite).

Referring particularly to FIGS. 5 and 6, in several embodiments, the disclosed rotor hub assembly 100 may also include a plurality of support members 120 extending between the inner hub 102 and the hub enclosure 118. In particular, each support member 120 may extend between a first end 142 and a second end 144, with the first end 142 of each support member 120 being coupled to the one of the hub segments 122 of the inner hub 102 and the second end 144 of each support member 120 being coupled to one of the enclosure segments 136 of the hub enclosure 118. For example, as shown in the illustrated embodiment, the first end 142 of each support member 120 may be secured to one of the connection areas 116 spaced apart around the outer perimeter of the inner hub 102. Additionally, the second end 144 of each support member 120 may be secured to one of a plurality of connection flanges 146 extending from the inner surface of the hub enclosure 118. However, in other embodiments, the support members 120 may be coupled between any other suitable portions of the inner hub 102 and hub enclosure 118.

In general, the support members 120 may comprise any suitable structural members that may be utilized to support the inner hub 102 within the hub enclosure 118. For instance, in several embodiments, the support members 120 may comprise beam-like members (e.g., I-beams). Similarly, the support members 120 may be formed from any suitable material that has material properties sufficient to permit the support members 120 to function as described herein. For instance, in several embodiments, the support members 120 may be formed from a suitable metal and/or any other suitable rigid and/or semi-rigid material.

Additionally, the first and second ends 142, 144 of the support members 120 may be configured to be coupled to the inner hub 102 and the hub enclosure 118, respectively, using any suitable attachment means and/or method known in the art. For example, in one embodiment, the support members 120 may be coupled to the inner hub 102 and the hub enclosure 118 using suitable fastening members (e.g., bolts, screws, pins, rivets and/or the like). In another embodiment, the support members 120 may be welded to the inner hub 102 and/or the hub enclosure 118.

Moreover, it should be appreciated that rotor hub assembly 100 may generally include any number of support members 120. For example, as shown in the illustrated embodiment, the rotor hub assembly 100 includes twelve support members 120 extending between the inner hub 102 and the hub enclosure 118. However, in other embodiments, the rotor hub assembly 100 may include less than twelve support members 120 or greater than twelve support members 120.

Referring still to FIGS. 5 and 6, in several embodiments of the present subject matter, it may be desirable for both the inner hub 102 and the hub enclosure 118 to be divided into the same number of segments 122, 134. For instance, as shown in the illustrated embodiment, the hub segments 122 and enclosure segments 134 each form substantially one-third of the inner hub 102 and the hub enclosure 118, respectively. Thus, the hub segments 122 and the enclosure segments 134 may be configured to form corresponding circumferential sections of the inner hub 102 and hub enclosure 134, respectively, so that, when the entire rotor hub assembly 100 is assembled together, the hub joints 124 of the inner hub 102 may be substantially circumferentially aligned with the enclosure joints 136 of the hub enclosure 118.

By configuring the hub segments 122 and the enclosure segments 134 to form corresponding circumferential sections of the inner hub 102 and hub enclosure 118, respectfully, it should be appreciated that individual hub modules 150 may be assembled in order to reduce the costs of shipping the various components of the rotor hub assembly 100 and/or to reduce the costs of assembling the various components of the rotor hub assembly 100. For example, as shown in FIG. 6, in one embodiment, each hub module 150 may include one of the pairs of segments 122, 134 forming the corresponding circumferential sections of the inner hub 102 and the hub enclosure 118, with such segments 122, 134 being coupled together using the support members 120. As such, each hub module 150 may generally form a substantially equal percentage or portion of the rotor hub assembly 100, such as by forming substantially one-third of the entire rotor hub assembly 100.

It should be appreciated that the individual hub modules 150 may be configured to be assembled at the site of the wind turbine 10 or at any other suitable location. For instance, in one embodiment, it may be desirable for the individual hub modules 150 to be pre-assembled at a first location (e.g., at the manufacturing assembly) prior to being transported to the wind turbine site. Upon arrival, the individual hub modules 150 may then be assembled together to form the entire rotor hub assembly 100. For example, the individual hub modules 150 may be assembled together at the wind turbine site at a location on the ground or aloft (e.g., by using a crane or other suitable lifting mechanism to assemble the hub modules 150 directly onto the wind turbine 10).

However, in alternative embodiments, it should be appreciated that the components of the rotor hub assembly 100 may be assembled in any other suitable order. For example, in one embodiment, the hub segments 122 and the enclosure segments 134 may be assembled separately to form the inner hub 102 and the hub enclosure 118, respectively, with the inner hub 102 then being mounted within the hub enclosure 118 using the support members 120. In another embodiment, the hub segments 122 may be initially assembled to form the inner hub 102, with the enclosure segments 134 being separately coupled to the inner hub 102 using the support members 120 and vice versa.

It should also be appreciated that the present subject matter is also directed to a method for assembling a rotor hub assembly 100 of a wind turbine 10. In several embodiments, the method may include assembling a plurality of individual hub modules 150, wherein each hub module 150 includes a hub segment 122, an enclosure segment 134 and at least one support member 120 extending between the hub segment 122 and the enclosure segment 134 and assembling the hub modules 150 together to form the rotor hub assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor hub assembly of a wind turbine, the method comprising:
   assembling an individual hub module, wherein the individual hub module includes a hub segment, an enclosure segment and at least one support member extending between the hub segment and the enclosure segment; and
   assembling a plurality of individual hub modules together to form the rotor hub assembly.

2. The method of claim 1, further comprising transporting the plurality of individual hub modules to a site of the wind turbine.

3. The method of claim 1, wherein each of the plurality of individual hub modules forms a substantially equal portion of the hub assembly.

4. The method of claim 3, wherein each of the plurality of individual hub modules forms substantially one-third of the hub assembly.

5. The method of claim 2, wherein the plurality of individual hub modules are assembled together to form the hub assembly after the plurality of individual hub modules are transported to the site.

6. The method of claim 1, wherein the hub segment of each individual hub module includes a flange, wherein assembling a plurality of individual hub modules together to form the rotor hub assembly comprises coupling together the flanges of the hub segments of adjacent individual hub modules.

7. The method of claim 1, wherein the enclosure segment of each individual hub module includes a flange, wherein assembling a plurality of individual hub modules together to form the rotor hub assembly comprises coupling together the flanges of the enclosure segments of adjacent individual hub modules.

8. The method of claim 1, further comprising coupling a plurality of rotor blades of the wind turbine to the hub assembly.

* * * * *